July 19, 1949.　　　R. S. ELBERTY, JR　　　2,476,653

PRESS FOR MOLDING BUILDING BLOCKS

Filed Feb. 24, 1945

Inventor
ROBERT S. ELBERTY JR.
By
Louis V. Lucia
Attorney

Patented July 19, 1949

2,476,653

UNITED STATES PATENT OFFICE 2,476,653

PRESS FOR MOLDING BUILDING BLOCKS

Robert S. Elberty, Jr., Plainville, Conn.

Application February 24, 1945, Serial No. 579,557

2 Claims. (Cl. 25—83)

This invention relates to a novel method for producing molded blocks and more particularly such blocks as commonly used for building constructions and which are molded of cement or other similar material.

Since it is required that such blocks must be similar in size, it has heretofore been common to place a certain amount of material in a mold and permit it to set. Before the material has set, remaining moisture may be forced out of the blocks by means of air pressure to thereby cause the blocks to harden, or become seasoned, in a shorter time than is required when the moisture is not removed. The air pressure method of removing the moisture, however, is necessarily slow in operation and requires complicated mechanism.

An object of the present invention is to provide a novel apparatus for forming blocks in molds and removing the moisture therefrom, while still in the molds, by mechanical means and thereby eliminating the use of complicated equipment.

A further object of this invention is to provide an apparatus wherein the blocks are first formed to accurate dimensions by compressing a certain amount of material in a mold and then removing the moisture therefrom by mechanically applying internal pressure to the block while it is still in the mold.

A further object is to provide an improved apparatus by which a block is formed, the moisture is removed therefrom and each block is produced with the same consistency and internal density.

Further objects and advantages will be more clearly understood from the following description and from the accompanying drawings in which.

Figure 5:
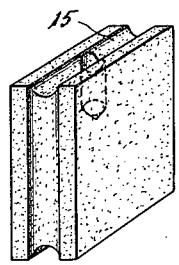
Fig. 5 is a perspective view of a building block produced by said method.

As illustrated in the drawings, my improved method for molding blocks may be practiced with the use of molding apparatus comprising a base 5 having an upright portion 6 forming the bottom of the mold and on which are mounted side plates 7—7 which are preferably channelled to receive between them front and rear plates 8—8. The said side and front and rear plates are placed in upright vertical position around the upright portion 6 of the base and clamped together by means of clamping rings 9 and 10 which engage, respectively, cam surfaces 11 and 12 on the side plates. It will be noted that the cams 11 are closer to the sides of the plates than the cams 12. This is to permit passing the clamping ring 10 over the cam 11 when moving said ring to its clamping position over the cams 12. When said side and front and rear plates are clamped together as above described, they form a mold having a cavity 13. In the form illustrated, the walls of the said cavity are preferably provided with half-round projections 14 which extend inwardly in the cavity from the plates forming the mold to thereby provide a block, as shown in Fig. 5, having a groove 15 in the edges of the block and extending around it; the said groove being particularly intended for use in a novel method of joining the blocks together as fully described in my co-pending application filed February 24, 1945 Serial No. 579,558.

A ram 16 is provided which fits closely between the said plates and has a stop-shoulder 17 which is adapted to engage the top edges of the plates 7—7 and 8—8 to thereby limit the downward travel of said cap for the particular size of block being molded. The said ram is provided with a half-round rib 18 projecting from its bottom and corresponding to the ribs 14. Grooves 19—19 are also provided in the sides of said ram to receive the projecting ribs 14 on the side plates 7—7.

A plunger 20 is slidably mounted within an elongated opening in said ram and is provided with a stop-shoulder 21 abutting a corresponding shoulder in said opening. The said plunger has a stem 22 extending therefrom to a point above the top of the ram 16.

The said molding apparatus may be used in connection with a suitable compound press having a plunger 23 adapted for forcing the ram 16 downwardly into the mold and a separate plunger 24 which is adapted to force the plunger 20 downwardly into the formed block; after the ram has reached the limit of its movement and is stopped by abutment between the stop-shoulder 17 and the tops of plates 7—7 and 8—8.

Figure 1:
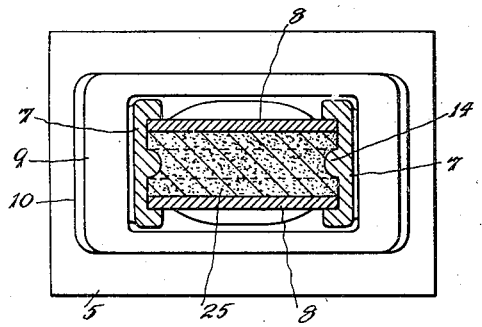
Fig. 1 is a plan view in section on line 1—1 of Fig. 2.
Figure 2:
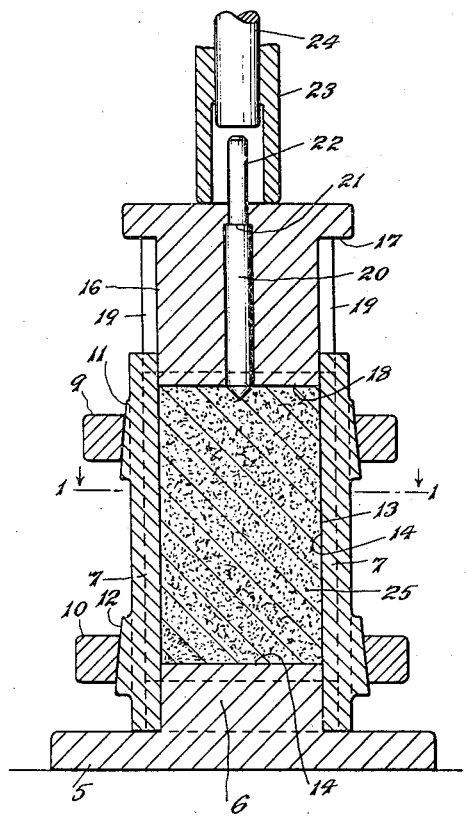
Fig. 2 is a front view in central vertical section of a mold apparatus used in my novel method and showing one step of said method.
Figure 3:
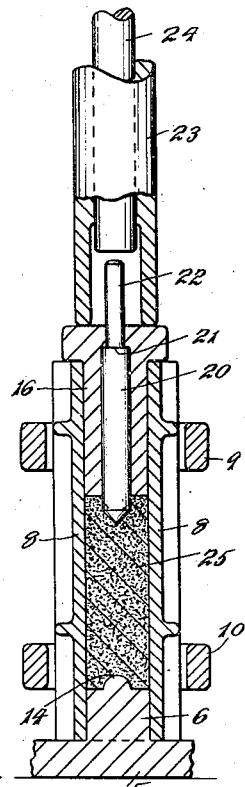
Fig. 3 is a side view thereof in central vertical section and showing a further step of my improved method.
Figure 4:
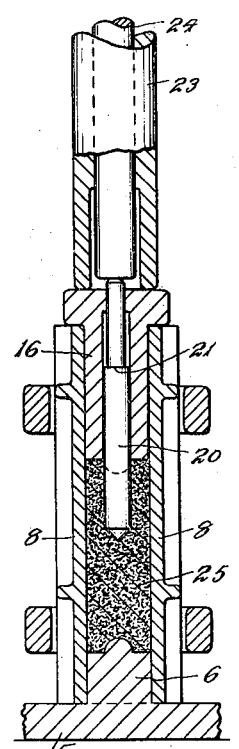
Fig. 4 is a similar view showing a still further step.

The operation of said apparatus is as follows:

The mold is first assembled by standing the plates 7—7 and 8—8 in position, as shown in Figs. 1 and 2, against the upright portion 6 of the base and then forcing the clamp rings 9 and 10 downwardly over the cams 11 and 12 to firmly clamp said plates in position and provide the molding cavity 13. It is here pointed out that slits are provided between the said plates which permit the passage of liquid therethrough but which are too small to permit the passage of the granular contents of the mixture material used for forming the block.

After the mold has been assembled as above described, the cavity is filled with the mixture, indicated at 25, which may consist of a suitable amount of inorganic material and which may be earth, sand, gravel or the like, mixed with a suitable amount of cement and water. The said mixture is placed in the mold until the cavity is filled to the top thereof and the mixture may be measured by scraping the surplus with a straight edge moved across the tops of the plates 7—7 and 8—8.

After the mixture has been so placed in the cavity, the ram 16 is positioned over the cavity and the entire mold is placed under the plungers 23 and 24 of the compound press. The plunger 23 is then first caused to move to force the ram 16 downwardly and compress the mixture 25 in the cavity. This will drive out excess water in the mixture through the crevices between the plates until the ram 16 is stopped by engagement between the tops of the mold into stop-shoulder 17. A block, as shown in Fig. 5, is now formed to the correct size, but it may vary from previous blocks in the density of the material therein and will still contain a certain amount of moisture. The plunger 20 is now forced downwardly by the operation of the plunger 24. This operation of the plunger 20 will further compress the material in the mold, without changing the size of the block, and cause extraction of any excess water or moisture remaining in the block.

The pressure applied upon the plunger 20 by the plunger 24 may be measured in any suitable manner, so that the said plunger 20 is forced into the formed block within the mold only to the required distance to eject moisture and compress the material to the required or predetermined density. Thus the distance to which the said plunger 20 is forced into the block may vary according to the consistency of the mixture placed in the mold, but each block, when completed, will be freed of all surplus moisture and may be compressed to a density which is uniform with that of other blocks produced in said mold.

From the above description, it will be clearly understood that I have provided a novel apparatus, for molding building blocks, which is economical and which will assure uniform consistency as well as a minimum of moisture content in each block.

The said novel apparatus has been found particularly useful in producing molded blocks from a material consisting of inorganic earth mixed with a small percentage of cement, as a binder, and may be mixed with a surplus of water to facilitate mixing and pouring of the mixture. The pressure applied by the plunger 20 to the material in the mold serves to force all the surplus water out of the block by compressing the material so that the said water is squeezed out of the material and forced out of the mold through the slits between the plates 7—7 and 8—8. Due to the relatively small displacement caused by the plunger 24, a very high pressure may be applied for the final compressing operation in the block without requiring an unduly heavy press.

It will be further understood that my novel apparatus permits molding of all blocks to uniform size and up to a reasonably uniform density of the material, then applying a final internal pressure in said block for bringing the density thereof to a uniform degree while still retaining the block at the uniform size.

I claim:

1. Apparatus for molding blocks of material containing liquid, said apparatus consisting of a vented mold having a vertical cavity, a vertical ram adapted to compress material in said cavity and dimensioned with respect to said cavity to prevent the escape of material in a direction toward the upper end of the ram, said ram having a central bore therein and a plunger slidable in said bore and normally projecting from the upper end of the ram and positioned at all times for completely closing the bore in the ram, cooperating means on the ram and plunger arranged to limit the upward movement of the plunger relative to the ram, a powered plunger engageable with the upper end of the ram and adapted to depress the ram in the mold cavity, and an independently operating plunger adapted to engage and lower the plunger carried by the ram into the material for applying internal pressure to the material in the cavity while held by the ram to further compress said material and expell liquid therefrom.

2. Apparatus for molding blocks of material containing liquid, said apparatus consisting of a vented mold having a vertical cavity, a vertical ram adapted to compress material in said cavity and dimensioned with respect to said cavity to prevent the escape of material in a direction toward the upper end of the ram, said ram having a central bore therein and a plunger slidable in said bore and normally projecting from the upper end of the ram and positioned at all times for completely closing the bore in the ram, cooperating means on the ram and plunger arranged to limit the upward movement of the plunger relative to the ram, a powered plunger engageable with the upper end of the ram and adapted to depress the ram in the mold cavity, an independently operating plunger adapted to engage and lower the plunger carried by the ram into the material for applying internal pressure to the material in the cavity while held by the ram to further compress said material and expel liquid therefrom, and means on the said ram adapted to be moved into engagement with the mold for limiting movement of the ram into the mold.

ROBERT S. ELBERTY, JR.

REFERENCES CITED

The following references are of record in the file of this patent:

UNITED STATES PATENTS

| Number | Name | Date |
|---|---|---|
| 754,640 | Brower | Mar. 15, 1904 |
| 949,505 | Snelling | Feb. 15, 1910 |
| 1,136,225 | Giguere | Apr. 20, 1915 |
| 1,416,691 | Crozier | May 23, 1922 |
| 2,090,784 | Davis | Aug. 24, 1937 |
| 2,254,107 | Miller et al. | Aug. 26, 1941 |